(12) United States Patent
Peiffer et al.

(10) Patent No.: US 11,136,175 B2
(45) Date of Patent: *Oct. 5, 2021

(54) PACK MADE OF POLYESTER WITH A THERMOFORMABLE LOWER FILM AND A SEALABLE AND PEELABLE UPPER FILM, USE THEREOF, AND PROCESS FOR ITS PRODUCTION

(71) Applicant: Mitsubishi Polyester Film GmbH, Wiesbaden (DE)

(72) Inventors: Herbert Peiffer, Mainz (DE); Martin Jesberger, Mainz (DE); Bodo Kuhmann, Runkel (DE); Stephan Audörsch, Darmstadt (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,939

(22) Filed: Jan. 13, 2020

(65) Prior Publication Data
US 2020/0223607 A1 Jul. 16, 2020

(30) Foreign Application Priority Data
Jan. 14, 2019 (DE) .................. 10 2019 200 365.6

(51) Int. Cl.
*B32B 1/02* (2006.01)
*B32B 27/36* (2006.01)
(Continued)

(52) U.S. Cl.
CPC .......... *B65D 65/40* (2013.01); *B29C 48/0018* (2019.02); *B29C 48/022* (2019.02);
(Continued)

(58) Field of Classification Search
CPC ........... B32B 1/02; B32B 27/08; B32B 27/36; B32B 2307/31; B32B 2307/51;
(Continued)

(56) References Cited

U.S. PATENT DOCUMENTS 10,618,260 B2 * 4/2020 Peiffer .................... B32B 27/36

FOREIGN PATENT DOCUMENTS

DE     103 18 102 A1    11/2004
EP      0 144 948 A     6/1985
(Continued)

OTHER PUBLICATIONS

European Search Report for corresponding application EP 20150954.4.

(Continued)

*Primary Examiner* — Walter Aughenbaugh
(74) *Attorney, Agent, or Firm* — ProPat, LLC

(57) ABSTRACT

The invention relates to transparent packaging for vacuum forming, inter alia, formed from a biaxially oriented, thermoformable polyester film as lower film (A) and a biaxially oriented polyester film as upper film (B) that is both heat-sealable and peelable (at least when the material is hot) in relation to the lower film (A). The present invention further relates to the use of such packaging to produce sealed, thermoformed packs, and to the processes for their respective production.

17 Claims, 2 Drawing Sheets

(51) Int. Cl.
*B65D 65/40* (2006.01)
*B65D 81/34* (2006.01)
*B29C 48/00* (2019.01)
*B29C 48/08* (2019.01)
*B29C 48/21* (2019.01)
*B29C 55/00* (2006.01)
*B29C 55/12* (2006.01)
*B32B 27/08* (2006.01)
*B65D 1/34* (2006.01)
*B65D 81/24* (2006.01)
*B29K 67/00* (2006.01)
*B29L 31/00* (2006.01)

(52) U.S. Cl.
CPC .............. *B29C 48/08* (2019.02); *B29C 48/21* (2019.02); *B29C 55/005* (2013.01); *B29C 55/12* (2013.01); *B32B 1/02* (2013.01); *B32B 27/08* (2013.01); *B32B 27/36* (2013.01); *B65D 1/34* (2013.01); *B65D 81/24* (2013.01); *B65D 81/343* (2013.01); *B29K 2067/00* (2013.01); *B29L 2031/712* (2013.01); *B32B 2307/31* (2013.01); *B32B 2307/51* (2013.01); *B32B 2307/518* (2013.01); *B32B 2307/581* (2013.01); *B32B 2307/72* (2013.01); *B32B 2439/02* (2013.01); *B32B 2439/70* (2013.01)

(58) Field of Classification Search
CPC ........ B32B 2307/518; B32B 2307/581; B32B 2307/72; B32B 2439/02; B32B 2439/70; B29K 2067/00; B29L 2031/712; B29L 2009/00; B65D 1/34; B65D 65/40; B65D 81/24; B65D 81/343; B65D 2581/3418; B65D 2581/3424; B29C 48/022; B29C 48/08; B29C 48/21; B29C 48/0018; B29C 55/005; B29C 55/12
See application file for complete search history.

(56) References Cited

FOREIGN PATENT DOCUMENTS

| | | |
|---|---|---|
| EP | 0 283 164 A | 9/1988 |
| EP | 0 407 870 A | 1/1991 |
| EP | 0 485 893 A | 5/1992 |
| EP | 0 503 422 A | 9/1992 |
| EP | 1 068 949 A | 1/2001 |
| EP | 1 471 098 A1 | 10/2004 |
| EP | 1 697 129 B1 | 9/2006 |
| EP | 2 810 776 A1 | 12/2014 |
| EP | 1 945 512 B1 | 6/2016 |
| EP | 1 475 228 B1 | 7/2017 |
| EP | 3 584 079 A1 | 12/2019 |
| JP | 05-009319 | 8/2012 |
| WO | 2018/004558 A1 | 1/2018 |

OTHER PUBLICATIONS

Ahlhaus, O.E.: Verpackung mit Kunststoffen [Packaging with plastics], Carl Hanser Verlag, p. 271, 1997, ISBN 3-446-17711-6. https://de.slideshare.net/AIBOFCE/mineral-oil-and-contaminants-theory-and-practical-solutions-for-paper-board.

* cited by examiner

PACK MADE OF POLYESTER WITH A THERMOFORMABLE LOWER FILM AND A SEALABLE AND PEELABLE UPPER FILM, USE THEREOF, AND PROCESS FOR ITS PRODUCTION

CROSS-REFERENCE TO RELATED APPLICATIONS

This application claims priority to German Patent Application 10 2019 200 365.6 filed Jan. 14, 2019, which is hereby incorporated herein by reference in its entirety.

FIELD OF THE INVENTION

The invention relates to a transparent pack comprising a biaxially oriented, thermoformable polyester film as lower film and a biaxially oriented, heat-sealable and peelable polyester film as upper film. The thermoformable lower film serves to hold food, e.g. meat, fish or poultry. The upper film serves to cover the lower film, and is securely sealed to the latter by means of heat. The pack has a self-venting (self-venting/self-opening) feature when it is used for cooking by way of example in an oven, in a microwave or in a compact grill at high temperature. The upper film can be peeled from the lower film after cooking with use of moderate force. The invention further relates to use of the pack and to a process for its production, including the packaging films from which the pack is formed.

BACKGROUND OF THE INVENTION

In particular, packs for meat, fish, poultry and dry ready-to-eat products (such as sandwiches, burgers or wraps) use transparent trays which are produced from thermoformable polyester, e.g. a-PET or modified b-PST, with use of vacuum and which, after filling with food, are closed by a film heat-sealed onto the edge of the tray. Provision of the product in such packaging is regarded as clean and hygienic, and is therefore very popular.

Vacuum processes, e.g. using Multivac machines, are a cost-effective method of producing hygienic packing for meat, fish or poultry. The finished packing here is generally produced as follows: A roll of the film for producing the tray—also termed lower film—is clamped into the front region of the machine. By way of one or more vacuum chambers, the film is thermoformed to a desired depth by use of heat and vacuum. According to the prior art (see, for example, EP 1 697 129 B1), depths up to about 70 mm can be achieved for example when laminates made of polyester and polyamide are used (see FIG. 3 for format). The food product is then placed into the tray, mostly by hand. By way of a further roll, the lid film—also termed upper film—is introduced to the tray and securely sealed to its perimeter, with use of heat and pressure. This step again mostly takes place under vacuum, which is applied to the entire pack. This is followed by separation into individual packs and other associated separate downstream operations, for example the printing or labelling of the packaging.

Certain products are precooked; this takes place by way of example in a water bath at 85° C. over a period of up to 6 hours. The packs—precooked or not precooked—are frozen and then marketed. The consumer thaws the pack and cooks it for a defined time in an oven at temperatures up to 220° C. The cooking time in essence depends on the pack size (corresponding to the mass of the food in the pack), and is about 30 min up to two hours. For this, the closed pack is placed into the preheated oven (cook-in), where it automatically opens at the seal seam (the term used for this being self-venting), ideally after 5 to 10 min.

Self-venting is an essential feature in the development of new packs with improved functionality or with modified design. The automatic opening of the seal seam, in essence as a consequence of the increased pressure of steam in the pack, allows the steam to escape from the pack, and the product becomes crisp and brown—as desired by a consumer. Once the cooking time has expired, the upper film is peeled while retaining its integrity—from the tray while it is still hot, and the contents of the pack are available for consumption.

The heat-sealing of the transparent tray made of thermoformable polyester to the upper film—likewise made of polyester—takes place at sealing temperatures between 120 and 220° C. The process is cost-effective if the sealing time can be restricted to 3 seconds or less. There are various possible ways of sealing lower and upper film. In the present case, both films, the lower film and the upper film, are made of polyester polymers (=monoPET or single-material packaging), the upper film being the sealable and peelable variant.

The pack of the invention produced from the two films exhibits the desired self-venting during cooking. Self-venting is achieved by adjusting the sealing properties of the upper film so that they are appropriate for the lower film.

The market places stringent optical requirements on the two films of the pack, in particular on haze, clarity and gloss. For good discernibility of the contents of the pack (size of the food), the haze of the pack should be <20% and the clarity of the pack should be >70%. The pack is moreover intended to be visually attractive. To this end, high gloss values of the pack are desirable.

High puncture resistance is also demanded from the pack, in order that it is not damaged during transport or during storage in the retail outlet.

Packs made of thermoformable lower film and sealable upper film are known.

EP 1 697 129 B1 describes a thermoformable film laminate which comprises a thermoformable film layer (a), a structural film layer (b), a heat-sealable layer (c) and optionally a barrier layer (d). The structural film layer (b) is adjacent to the first surface of the thermoformable film layer (a), and the heat-sealable layer (c) is on the opposite, second surface that is directed towards the internal side of the pack. The thermoformable film layer (a) comprises a polymer composition comprising at least 80% by weight of polyethylene terephthalate. The structural film layer (b) can comprise a large number of polymers, and preferably comprises a polyamide. The heat-sealable layer (c) can likewise comprise a large number of different polymers, and preferably comprises an amorphous polyester. The laminate is suitable for the application mentioned in the introduction, but requires improvement in thermoformability and puncture resistance, and especially requires improvement in optical properties such as haze, clarity and gloss.

EP 1 945 512 B1 describes a process for the packaging of fish or meat which in essence comprises the steps mentioned in the introduction of the present application: (i) provision of a thermoformable polymeric holder film (=lower film) and of a polymeric cover film (=upper film). The holder film consists of a single-layer polyester substrate or polyamide substrate, and the cover film is preferably comprised of polyester polymers. At least one of the two surfaces of the holder film and of the cover film is heat-sealable, (ii) Provision of an elevated exterior portion and of a lowered central portion in the holder film via thermoforming, (iii) Arrangement of a portion of meat or fish on the interior (=first) surface of the holder film, (iv) Arrangement of the cover film over the portion of meat or fish, so that the interior first) surface of the cover film faces towards the interior surface of the holder film, (v) Bringing the peripheral portions of the first surface of the holder film and of the first surface of the cover film into contact and formation of a heat-sealed bond therebetween, and (vi) optionally freezing of the packaged meat or fish. The process is suitable for the application mentioned in the introduction; however, the films described in more detail in EP 1 94 5 512 B1 require improvement in thermoformability and puncture resistance, and especially require improvement in optical properties (haze, clarity and gloss).

WO 2018/004558 describes recyclable packaging made of polyester—consisting of a tray made of thermoformable film and of a lid film. The application includes two embodiments: In embodiment 1 [07], the tray is formed from an oriented polyethylene terephthalate film and from a heat-sealing lacquer made of polyester copolymer applied onto the said film by coating. The lid film is a single-layer film (=monofilm)—formed from amorphous polyethylene terephthalate or oriented polyethylene terephthalate or crystalline polyethylene terephthalate or recycled polyethylene terephthalate. In embodiment 2 [08] the lid film is formed from an oriented polyethylene terephthalate film and from a heat-sealing lacquer made of polyester copolymer applied onto the said film by coating. The tray is a monofilm— formed from amorphous polyethylene terephthalate or oriented polyethylene terephthalate or crystalline polyethylene terephthalate or recycled polyethylene terephthalate. The application mentions examples of commercially available films that can be used for the tray or for the lid film. However, the application contains no information concerning formulations or processes for the production of the films mentioned.

SUMMARY OF ADVANTAGEOUS EMBODIMENTS OF THE INVENTION

It was an object of the present invention to provide, for the use mentioned in the introduction, packaging which is made of polyester and which features good thermoformability of the lower film and excellent sealing and peeling properties of the upper film in relation to the lower film. The pack is moreover intended to have good self-venting properties and good optical properties. It is intended to overcome the disadvantages of films of the prior art, and in particular to feature the following points/properties:

The lower film of the packaging is intended to have thermoformability sufficiently good to permit problem-free use thereof for packing, in the desired packing design, of commercially available cuts of meat, poultry or fish, or dry products, e.g. sandwiches. The lower film is intended to be amenable for thermoforming up to a depth of 70 mm, in line with the requirements of the market (see FIG. 3 for format).

A further intention is that the two films also have very good mechanical properties, but in particular that the lower film has very good mechanical properties. For the present application, the particularly important mechanical property of the lower film is puncture resistance. It is intended to be sufficiently high to permit avoidance of damage during transport and storage of the pack.

Sealing of the pack between lower film and upper film is intended to be such that it withstands inter alia pre-cooking in a water bath (with water bath temperature up to 85° C., time in water bath up to 6 hours) with no resultant opening of the seal seams.

The pack is intended to self-vent during the cooking procedure, e.g. in a conventional oven at up to 220° C., where the self-venting ideally is intended to occur after a period of about 5 to 15 min in the oven.

The pack is intended to feature excellent sealing and peeling properties of the upper film in relation to the lower film. It is desirable that the pack remains securely closed and does not open as a result of, for example, shaking during transport—even after sealing via contaminated surfaces, for example via a tray perimeter contaminated with meat juices (which have been removed to a substantial extent at least on the sealing areas, for example by wiping). The sealing force here is intended to be in the range about 2 to 10 N per 15 mm of film strip width. After the cooking procedure, the upper film is intended to be amenable, while still hot, to peeling from the lower film, with no resultant tearing or tear-propagation in the upper film.

The pack is intended to feature brilliant optical, properties. This relates to haze, but in particular to clarity of both films of the pack. It is desirable that the haze of both films is below 20% and that their clarity is above 70%. The customer's wish is by way of example to be able to see the contents of the pack clearly and in detail during purchase of the product. The pack is moreover intended to be visually attractive by virtue of maximized gloss.

A further requirement is that the pack withstands the cooking procedure without any white clouding, for example due to crystallization of the films during the cooking procedure.

The pack is moreover intended to have good barrier properties, in particular with respect to oxygen and water vapour. The transmission rate values of conventional biaxially oriented PET films produced according to the prior art serve for comparison (see, for example, http://www.bfr.bund.de/cm/343/barrierewirkung-ausgewaehlter-kunststoffmaterialien-gegen-die-migration-von-mineraloelfraktionen-in-lebensmittel.pdf); these must not be exceeded, or may be exceeded only marginally (<5%). The transmission rate values of PET films (not thermoformed) of thickness 100 µm are: OTR=12 cm$^3$/(m$^2$ d bar) and WVTR=2 g/(m$^2$ d).

The two transparent films (see further below for concentration of antiblocking agent) of the pack are intended to have good winding properties and good processing properties. Adhesion of the individual film plies to one another during wind-up and unwinding of the films is not permitted, even at elevated temperature, e.g. 50 or 60° C. Any increase of adhesion between the individual film plies would render unwinding of the films difficult or even impossible.

Production of the pack is intended to be cost-effective. This means by way of example that processes conventional in the industry can be used for the production of lower film and upper film.

DETAILED DESCRIPTION OF ADVANTAGEOUS EMBODIMENTS OF THE INVENTION

Figure 1:
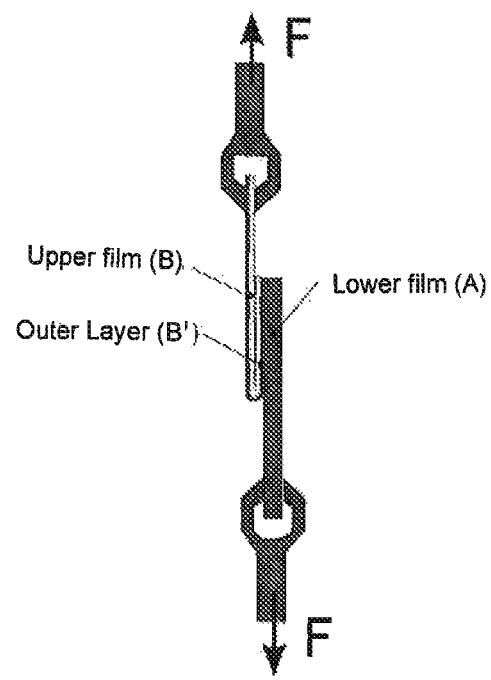
FIG. 1 is a schematic illustration of the configuration and forces applied to an exemplary inventive film during tensile-strain-testing.

The foregoing objects are achieved via provision of the inventive transparent packaging for vacuum forming. The inventive packaging comprises a biaxially oriented, thermoformable polyester film as lower film (A) and a biaxially oriented polyester film as upper film (B), with upper film (B) being heat-sealable and peelable in relation to the lower film (A).

I The lower film (A) is a film which comprises at least 85% by weight of a copolyester in which 85 to 94 mol % of the dicarboxylic acid components are based on terephthalic-acid-derived units and 6 to 15 mol % of the dicarboxylic acid components are based on isophthalic-acid-derived units, where the film
   a) has an area modulus of elasticity in the range 4500 to 6400 N/mm$^2$
   b) has a sum of strength values ($\sigma_5$ value) in longitudinal direction and in transverse direction in the range 170 to 220 MPa
   c) has a puncture resistance
      F[N]>0.35 d[µm], where d=film thickness
   d) has a density below 1395 kg/m$^3$
   e) has a haze below 2.0% and clarity at least 85% and
   f) has a thickness in the range 50 to 300 µm.

II The upper film (B) is a film which has a base layer (B") and an outer layer (B') which is heat-sealable and peelable in relation to the lower film (A), where the heat-sealable and peelable outer layer (B')
   a) is comprised of at least 60% by weight of a polyester which is comprised of 25 to 95 mol % of units based on at least one aromatic dicarboxylic acid and 5 to 75 mol % of units based on at least one aliphatic dicarboxylic acid, where the sum of the dicarboxylic-acid-derived molar percentages is 100; and
   b) comprises up to 10% by weight of inorganic and/or organic particles with median diameter $d_{50}$ 1.5 to 5.0 µm, where the ratio of particle size $d_{50}$ to thickness of the outer layer (B') is above 1.0; and
   c) the thickness of the outer layer (B') is 1.5 to 5.0 µm; and where the upper film (B)
      has a haze below 20% and clarity of at least 70%,
      has a seal seam strength in relation to itself (fin sealing) and in relation to the lower film (A) which is in the range 2 to 10 N/15 mm and
      has a thickness in the range 20 to 125 µm.

Unless otherwise stated, the expression "% by weight" above and hereinafter is always based on the composition of the respective layer or on the respective system to which the information relates.

(I) Lower Film (A)=Thermoformable Polyester Film

The packaging according to the present invention comprises a thermoformable lower film (A) comprised of a transparent, biaxially oriented, single-layer polyester film (A), or of a transparent, biaxially oriented, multilayer coextruded polyester film, e.g. (A' A" A''').

Copolyester

The lower film (A) comprises at least 85% by weight of a thermoplastic copolyester. According to the invention, this is a copolyester in which 85 to 94 mol % of the dicarboxylic acid components are based on terephthalic-acid-derived units and 6 to 15 mol % of the dicarboxylic acid components are based on isophthalic-acid-derived units. It is preferable that this is a film comprised of a copolyester in which 86 to 93 mol % of the dicarboxylic acid components are based on terephthalic-acid-derived units and 7 to 14 mol % of the dicarboxylic acid components are based on isophthalic-acid-derived units. According to the invention, ethylene glycol is preferably suitable as diol in the thermoplastic copolyester.

From 0 to 15% by weight of the lower film (A) can be comprised of other polymers/polymer fractions and/or of other substances, where the other polymers/polymer fractions derive from other aromatic and/or aliphatic dicarboxylic acids and, respectively, diols. It is also advantageously possible to use, for the thermoplastic polyester of the lower film (A), mixtures or blends of the abovementioned homo- and/or copolymers.

Suitable other aromatic dicarboxylic acids are preferably terephthalic acid, furan-2,5-dicarboxylic acid (FDCA), biphenyl-4,4'-dicarboxylic acid, naphthalenedicarboxylic acids (for example naphthalene-1,4- or -1,6-dicarboxylic acid or naphthalene-2,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the ($C_3$-$C_{19}$) alkanediacids are particularly suitable, where the alkane moiety can be straight-chain or branched.

Examples of suitable other aliphatic diols are diethylene glycol, triethylene glycol, aliphatic glycols of the general formula HO—(CH$_2$)$_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms, or cycloaliphatic, optionally heteroatom-containing diols having one or more rings. Among the cycloaliphatic diols, mention may be made of cyclohexanediols (in particular cyclohexane-1,4-diol). Suitable other aromatic diols have by way of example the formula HO—C$_6$H$_4$—X—C$_6$H$_4$—OH, where X is —CH$_2$—, —C(CH$_3$)$_2$—, —C(CF$_3$)$_2$—, —O—, —S—, or —SO$_2$—.

The desired good mechanical properties, and in particular the desired good thermoformability of the biaxially oriented polyester film, are/is obtained via selection of the fractions according to the invention that are based on terephthalic-acid-derived units and on isophthalic-acid-derived units. If the proportion of the dicarboxylic acid components based on isophthalic-acid-derived units is below 6% by weight, it is impossible to obtain the desired good thermoformability of the film. If, on the other hand, this proportion is above 15% by weight, reliable production of the lower film (A) by the process described below is no longer achievable. Films consisting of such high proportions of components based on isophthalic-acid-derived units exhibit, during the production process by way of example, a very strong tendency toward adhesion to themselves or to relevant machine components, e.g. rolls during longitudinal stretching or rolls at the outgoing end of the machine downstream of transverse stretching.

The polyesters can be produced by the transesterification process. This starts from dicarboxylic esters and diols, which are reacted with the conventional transesterification catalysts, for example zinc salts, calcium salts, lithium salts and manganese salts. The intermediates are polycondensed in the presence of well-known polycondensation catalysts, for example antimony trioxide, titanium oxide, or else germanium compounds. Successful production can equally be achieved by the direct esterification process in the presence of polycondensation catalysts. This starts directly from the dicarboxylic acids and the diols.

It has proved to be particularly advantageous to polycondense the intermediates in the presence of titanium dioxide or germanium compounds, or to carry out the direct esterification process in the presence of polycondensation catalysts such as titanium dioxide or germanium compounds. The biaxially oriented polyester film is then antimony-free. In the particularly preferred case, the desired product is a biaxially oriented polyester film which comprises no antimony and therefore can be used in packaging applications where the film has direct contact with food.

Other Parameters Required to Achieve the Object

The film according to the present invention is characterized by an area modulus of elasticity, $E_{area}$, in the range 4500 to 6400 N/mm$^2$, in accordance with the following formula:

$$E_{area} = \sqrt{(E_{MD}^2 + E_{TD}^2)}.$$

where $E_{MD}$ is the modulus of elasticity of the film measured in longitudinal direction of the machine, and $E_{TD}$ is the modulus of elasticity of the film measured in transverse direction of the machine. This property is in essence achieved by compliance with the production procedure described below according to the invention in conjunction with the polyesters described above according to the invention. Surprisingly, it has been found that if the area modulus is below 4500 N/mm$^2$, the film no longer has the desired mechanical properties and is therefore unsuitable for the abovementioned application. By way of example, the excessively low area modulus of elasticity then prevents satisfactory winding of the film; undesirable creases arise. It has moreover been found in the context of the present invention that, on the other hand, if the area modulus is above 6400 N/mm$^2$ the film can no longer be thermoformed as required by the object of the invention.

The film according to the present invention is moreover characterized by the sum of strength values (as value) in longitudinal direction (MD) and in transverse direction (TD) in the range 170 to 220 MPa. Again, this property is in essence achieved by compliance with the production procedure described below according to the invention in conjunction with the polyesters described above according to the invention. If the sum of strength values is below 170 MPa, the film no longer has the desired mechanical properties and is therefore unsuitable for the application. By way of example, because the sum of strength values is too small, the film can then no longer be satisfactorily transported within the thermoforming machine; the film undergoes undesirable distortion. If, on the other hand, the sum of strength values is above 220 MPa, the film can no longer be thermoformed as required by the object of the invention.

The film according to the present invention is moreover characterized by density below 1395 kg/m$^3$. Again, this property is in essence achieved by compliance with the production procedure described below according to the invention in conjunction with the polyesters described above according to the invention. If the density of the film is above 1395 kg/m$^3$, the film is surprisingly too crystalline to permit thermoforming as required by the object of the invention.

SV Value of the Lower Film (A)

In order to achieve the desired good mechanical properties, and in particular in order to achieve the desired good thermoformability, it is necessary that the SV value of the lower film (A) is within a particular range. According to the invention, the SV value of the lower film (A) is in the range 680 to 1000, preferably in the range 710 to 950, with particular preference in the range 740 to 900. The SV values of the respective polymer melts (base layers and outer layers) should differ by no more than 100 units, preferably no more than 75, and in particular no more than 50.

Figure 3:
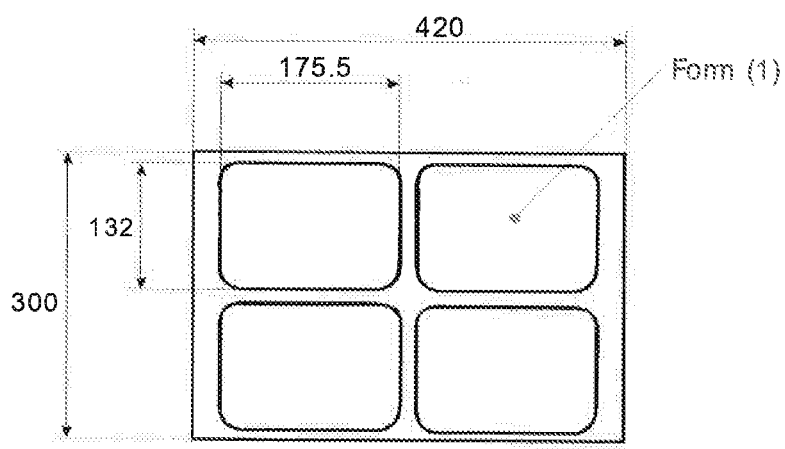
FIG. 3 is a schematic illustration on an exemplary format for trays incorporating the inventive films.

If the SV value of the film is below 680, it is impossible to achieve the required good thermoformability of the film: about 70 mm draw depth (see FIG. 3 for format). On the other hand, if the SV value is above 1000, the polyester is too viscous and by way of example can no longer be extruded cost-effectively.

Antiblocking Agent in Lower Film (A)

In order to improve the processing performance of the film, it is advantageous to incorporate particles into the lower film (A). Compliance with the following conditions has been found to be advantageous here:

a) The median diameter $d_{50}$ of the particles is to be 1.5 to 5.0 µm. It has proved to be particularly advantageous to use particles with $d_{50}$ 1.7 to 4.5 µm, and particularly preferably 2.0 to 4.0 µm.

b) The particles are intended to be present at a concentration of 0 to 0.1% by weight (1000 ppm) in the lower film. The concentration of the particles in the film is preferably $1.0 \times 10^{-5}$ to 0.075% by weight and particularly preferably $1.1 \times 10^{-5}$ to 0.05% by weight.

If particles with diameter $d_{50}$ below 1.5 µm are used the particles have no favourable effect by way of example on the winding of the film. The film then exhibits a tendency by way of example towards undesirable tearing or tear-propagation during unwinding. Particles with diameter $d_{50}$ above 5.0 µm generally cause problems during orientation of the film; vacuoles are increasingly formed and adversely affect the haze of the film. If the lower film (A) comprises particles at a concentration above 0.1% by weight, the haze of the film is no longer in the range according to the invention.

Conventional antiblocking agents are conventional inorganic and/or organic particles, for example calcium carbonate, amorphous silica, talc, magnesium carbonate, barium carbonate, calcium sulfate, barium sulfate, lithium sulfate, calcium phosphate, magnesium phosphate, aluminium oxide, the calcium, barium, zinc or manganese salts of the dicarboxylic acids involved in the lower film (A), titanium dioxide, kaolin, or crosslinked polystyrene particles, or crosslinked polymer particles based on acrylic acid derivatives.

The particles can be added to the lower film (A) at the respectively advantageous concentrations, e.g. in the form of glycolic dispersion during production of the polyester, i.e. during polycondensation thereof, or in the form of masterbatch during extrusion of the film.

Particles preferred according to the invention are synthetic, amorphous SiO$_2$ particles in colloidal form. The particles become bound in excellent manner into the polymer matrix, and produce only a small number of vacuoles. Vacuoles can by way of example arise during the biaxial orientation of the film; they generally increase haze, and therefore are to be avoided as far as possible for the present invention. In relation to production of the SiO$_2$ particles, reference is made to the prior art; the production process is disclosed in detail by way of example in EP 1 475 228 B1.

Radical-Scavengers in the Film

In what is known as the cook-in process (in which connection see EP 1 697 129 or EP 2810776 A1), the pack or packaging is placed, closed, into the oven, and is removed from the oven after a particular cooking time. The cooking time depends in essence on the pack or packaging size (mass of contents), and generally ranges between 30 min and two (2) hours.

This procedure results in a low level of thermal stress across a large part of the area of the thermoformable film. The film is subjected to significantly increased thermal stress only in the edge region of the pack, and in particular at the corners of the pack (sealed edge). While evaporation of water ensures that the remainder of the thermoformed film experiences temperatures significantly below 160° C., the corner region of the pack is exposed to oven temperature for the entire cooking time.

In extreme cases here, the corner region of the film is subject to thermal stress at a temperature of 220° C. for more than 2 h, and at this elevated temperature oxygen can penetrate into the polymer.

A possible consequence of this is embrittlement of the pack or packaging, and therefore of the film, in particular at the corners, and a tendency towards splintering. This is extremely undesirable and must be avoided.

If increased heat resistance is required for this application sector, the film—preferably made of antimony-free polyester—preferably comprises one or more radical-scavengers. This/these radical-scavenger(s) is/are preferably based on phenolic antioxidants.

Surprisingly, it has been found that the film comprising one or more radical-scavengers exhibits significantly increased heat resistance, and that therefore packaging and packs produced therefrom can remain for more than one hour in an oven at temperatures above 220° C. without resultant embrittlement.

In a preferred embodiment, the film according to the present invention comprises 500-3000 ppm of a radical-scavenger, the content preferably being between 600 and 2500 ppm and with particular preference between 700 and 2000 ppm. Contents below 500 ppm tend to lead to failure in the oven (=splintering), and contents higher than 3000 ppm have no further improving effect on the film and therefore merely reduce cost-effectiveness, and can lead to migration of the stabilizer out of the film into a packaged food. Contents above 3000 ppm moreover tend to lead to formation of gels and to an undesired yellow tinge of the film.

The radical-scavenger used can be either one compound (preferably) or else a mixture of various radical-scavengers. The radical-scavenger(s) used is/are preferably selected from the group of the phenolic antioxidants.

Preferred radical-scavengers are pentaerythritol tetrakis [3-(3,5-di-tert-butyl-4-hydroxyphenyl)propionate] (CAS No. 6683-19-8) and 1,3,5-trimethyl-2,4,6-tris(3,5-di-tert-butyl-4-hydroxybenzyl)benzene) (CAS No. 1709-70-2) obtainable from BASF with trade names Irganox 1010 and Irganox 1330.

The effectiveness of the radical-scavenger can be tested directly on the packaging, e.g. after removal of the pack or packaging from the oven. The pack or packaging is described here as good (i.e. suitable for the application) if no splintering is observed anywhere in the film according to the present invention.

Structure of the Lower Film (A)

The lower film (A) can have a single-layer or multilayer (i.e. at least two-layer) structure. A single-layer structure of the film has proved to be particularly advantageous for achieving the abovementioned properties, in particular the required good optical properties of the polyester film. However, a two- or three-layer structure of the lower film (A) has also proved to be suitable, made of two layers A' and A" or three layers A'A"A' or A'A"A'". The quantity of particles in the base layer A" of a, for example, three-layer film here should be smaller than in the two layers A' (and A'"), which, are preferably kept identical in the structure, but can also be different.

The particle concentration in the layer (A") should be selected in a manner that has an advantageous effect on the haze and the gloss of the film. The particle concentration in the layer (A") of a three-layer film of the abovementioned type will be between 0 and 0.08% by weight, preferably between 0 and 0.05% by weight, and in particular between 0 and 0.02% by weight. The diameter of the particles used is particularly preferred with $d_{50}$ above 1.5 µm.

When particle concentration in the outer layers (A' or A'") and in the base layer (A") is selected, care must be taken to ensure that particle concentration in the entire film does not exceed the value of 0.1% by weight according to the present invention.

The thickness of the two layers A' (or A' and A'") can be identical or different. Their thicknesses are generally between 0.2 and 5 µm. The lower film (A) can moreover additionally comprise conventional additives, for example stabilizers (UV, hydrolysis) or other fillers (e.g. colour pigments) in the concentrations recommended by the manufacturer. They are advantageously added to the polymer or, respectively, polymer mixture before melting in the extruder.

Thickness of the Lower Film (A)

The total thickness of the polyester film (A) according to the invention can vary within particular boundaries. It is 50 to 300 µm, preferably 51 to 200 µm and particularly preferably from 52 to 200 µm. If the thickness of the film (A) is below 50 µm, the mechanical properties and the barrier properties of the thermoformed film are inadequate. If the thickness of the film (A) is, in contrast, above 300 µm, the thermoformability of the film becomes poorer, and moreover production of the film becomes uneconomic; both of these outcomes are undesirable.

Process for the Production of the Lower Film (A)

The present invention likewise provides a process for the production of the thermoformable lower film (A). It comprises the production of the lower film by extrusion (production of layer (A)) or coextrusion (e.g. production of the layers (A'A"A'")), biaxial stretching of the lower film (A), and also heat-setting and wind-up of the stretched lower film (A).

In the coextrusion process, the respective melts are extruded in separate extruders and then these are shaped in a coextrusion die to give flat melt films and mutually superposed in layers. The multilayer film is then drawn off and solidified with the aid of a chili roll and optionally other rolls. For the mixing of the various components, it has proved to be advantageous here to use a vented twin-screw extruder to extrude the polymers for the layer (A) or layers (A'A"A'"). The film thus produced has fully satisfactory optical properties, e.g. exhibits no clouding or streaking.

The biaxial stretching of the film as carried out sequentially. Sequential stretching begins with stretching in longitudinal direction, which is followed by stretching in transverse direction. The stretching in longitudinal direction can be achieved by way of example with the aid of two rolls rotating at different speeds corresponding to the desired stretching ratio. The transverse stretching is generally achieved by using an appropriate tenter frame.

The temperatures at which the biaxial stretching is carried out can vary within certain ranges; they depend in essence on the desired properties, in particular on the desired thermoforming properties of the film according to the invention. Surprisingly, it has been found here that in order to achieve the desired thermoformability the film should be stretched to a significantly smaller extent than is conventional according to the prior art.

In order to achieve the desired thermoformability of the lower film (A), the stretching in longitudinal direction is carried out under particular conditions. The temperature of the film during stretching is in the range 70 to 100° C. (the heating temperatures of the rolls being 60 to 110° C.). The longitudinal stretching ratio is in the range 2.0:1 to 4.0:1, preferably in the range 2.1:1 to 3.8:1 and particularly preferably in the range 2.2:1 to 3.6:1. If the film is oriented at less than 2.0:1, by way of example the thickness profile is poor; if the film is oriented at more than 4.0:1, thermoformability is no longer adequate.

The longitudinal stretching is followed by transverse stretching in an appropriate tenter frame. The temperatures of the heating fields in the tenter frame are 70 to 120° C. (film temperature: 60 to 110° C.). The stretching in transverse direction is kept in the film temperature range 90° C. (start of stretching) to 140° C. (end of stretching). According to the invention, the transverse stretching ratio is in the range 2.2:1 to 3.8:1, preferably 2.4:1 to 3.7:1 and particularly preferably in the range 2.6:1 to 3.6:1. If the film is oriented at less than 2.2:1 by way of example the thickness profile is poor; if the film is oriented at more than 3.8:1, thermoformability is no longer adequate.

The biaxial orientation is followed by heat-setting of the film. Surprisingly, it has been found that in order to achieve the abovementioned desired good thermoformability of the film it is necessary to carry out the heat-setting under particular conditions according to the invention. According to the invention, the heat-setting time is 5 to 25 s, preferably 6 to 22 s and particularly preferably 7 to 20 s. According to the invention, the heat-setting temperature is in the range 175 to 220° C., preferably in the range 178 to 215° C. and particularly preferably in the range 180 to 210° C.

After heat-setting, the film is cooled and conventionally wound up.

Compliance with the abovementioned process conditions for the production of the lower film (A) according to the invention is important. Failure to comply with the abovementioned process conditions according to the invention for longitudinal stretching and transverse stretching, and also for setting of the lower film (A), can lead to failure to achieve the properties according to the invention of the film in respect of mechanical properties of the film, and in particular in respect of the desired thermoformability and puncture resistance; this is undesirable.

Coating (C) of the Lower Film (A)

In a preferred embodiment, in order to improve the windability of the transparent film with low filler content, at least one surface of the lower film is coated in-line or off-line with a further layer (C) which comprises poly(alkyl acrylate) and/or poly(alkyl methacrylate) and/or poly (alkyl acrylate-co-alkyl methacrylate). It is moreover possible that acrylic and/or methacrylic copolyesters are present which bring about crosslinking of the polymers. It is preferable here to use N-methylolacrylamide for the production of the copolymers. It is moreover also possible to use other crosslinking agents, e.g. melamine. The coating is preferably applied in-line.

The coating (C) according to the present invention is described in detail in EPA 0 144 948, which is expressly incorporated by way of reference here.

The preferred acrylate coating is applied to at least one side of the lower film (A), and in essence serves to improve winding, and in particular to improve unwinding of the film after storage (at elevated temperatures). The coating formulation can comprise known additions, e.g. antistatic agents, wetting agents, surfactants, pH regulators, antioxidants, dyes, pigments, and antiblocking agents, e.g. colloidal $SiO_2$, etc. It is normally advisable to incorporate a surfactant in order that the ability of the aqueous coating to wet the polyester carrier film is further increased, and in order to stabilize the particles made of copolymers derived from acrylic/methacrylic acid.

Application of the Layer (C)

Coating of the lower film (A) with the acrylically crosslinking layer (C) is achieved either in-line, preferably between the first and second stretching step, or off-line after production of the biaxially oriented film.

In the case of in-line coating, which is preferably used, a layer (C) is used to coat one or both surfaces of the lower film (A) before transverse stretching. In the case of off-line coating, the layer (C) is preferably applied after production of the lower film (A).

The polyester film is coated with a functional coating in a manner such that the thickness of the coating on the finished polyester film is preferably 5 to 100 nm, particularly preferably 10 to 90 nm and very particularly preferably 15 to 80 nm. Particular preference is given to application of the layer (C) by means of the reverse gravure-roll coating process, which can apply the coating extremely homogeneously in layer thicknesses up to 200 nm. The coating is preferably applied in the form of solution, suspension or dispersion, particularly preferably in the form of aqueous solution, suspension or dispersion.

The abovementioned substances are applied in the form of dilute, aqueous solution or dispersion to one or both film surfaces, and then the solvent is evaporated. If the coating is applied in-line before transverse stretching, the temperature during transverse stretching and subsequent heat-setting is sufficient to evaporate the solvent and dry the coating.

Inventive Properties of the Lower Film (A)

The lower film (A) according to the invention, produced by the process described above according to the invention, has a number of properties of which the most important are listed below.

The lower film (A) according to the invention features very good mechanical properties for the intended application (area modulus of elasticity, sum of strength values, puncture resistance); these inter alia permit achievement of the desired good thermoformability and the desired good puncture resistance.

The lower film (A) features brilliant optical properties. The haze of the lower film (A) is below 2% and the clarity is above 85% and gloss above 140.

Surprisingly, the puncture resistance F[N] of the film, this being important for the application, is sufficiently high to permit damage-free transport and storage of the thermoformed pack produced therefrom. According to the invention, the puncture resistance F of the lower film (A) in the thickness range defined correlates with the thickness d of the film in accordance with the following formula:

$$\frac{F[N]}{d[\mu m]} > 0.35$$

The thermoformability of the lower film (A) is at least 70 mm (see FIG. 3 for format), at a thermoforming ratio of at least 2.5. Trays having this thermoformability according to the invention can be used for problem-free packing, in conventionally designed packing, of the usual commercial portions of meat, poultry or fish.

The lower film (A) has the required good barrier properties, in particular in respect of oxygen, water vapour and various flavours.

The highly transparent lower film (A) has good winding properties and good processing properties. When the films are wound, the individual film plies do not adhere to one another, even at elevated temperature, for example 50 or 60° C.

The film can moreover be produced cost-effectively. This means by way of example that processes conventionally used in the industry can be used to produce the lower film.

The thermoformable polyester film according to the invention has excellent suitability for the packing or packaging of foods and of other consumable items. It is in particular suitable for the packing or packaging of foods and other consumable items in thermoformed trays produced by the above process.

Table 1 collates inter alia the most important inventive properties of the film.

TABLE 1

|  |  | Inventive range | Preferred | More preferred | Unit | Test method |
|---|---|---|---|---|---|---|
| Lower film (A) | | | | | | |
| Proportion of copolyester in lower film (A) | | ≥85 | ≥86 | ≥87 | % to wt. | |
| Proportion of copolyester units derived from isophthalate units | | 6 to 15 | 7 to 14 | 8 to 13 | Mol. % | |
| Filler concentration | | 0 to 0.1 | $1.0 \times 10^{-5}$ to 0.075 | $1.1 \times 10^{-5}$ to 0.05 | % to wt. | |
| Particle diameter $d_{50}$ | | 1.5 to 5 | 1.7 to 4.5 | 2.0 to 4.0 | μm | |
| Process technology | | | | | | |
| Longitudinal stretching (T procedure) | Heating temperature of rolls | 60 to 110 | 65 to 105 | | ° C. | |
| | Stretching temperature of film | 70 to 100 | 75 to 100 | | ° C. | |
| | Longitudinal stretching ratio | 2.0 to 4.0 | 2.1 to 3.8 | 2.2 to 3.6 | | |
| Transverse stretching | Temperature of heating fields | 70 to 120 | | | ° C. | |
| | Heating temperature of film | 60 to 110 | | | ° C. | |
| | Stretching temperature | 90 to 140 | | | ° C. | |
| | Transverse stretching ratio | 2.2 to 3.8 | 2.4 to 3.7 | 2.6 to 3.6 | ° C. | |
| Setting | Temperature | 175 to 220 | 178 to 215 | 180 to 210 | ° C. | |
| | Time | 5 to 25 | 6 to 22 | 7 to 20 | sec | |
| Properties of film | | | | | | |
| Area modulus of elasticity | | 4500 to 6400 | 4600 to 6300 | 4700 to 6300 | N/mm² | ISO527-1 and ISO 527-3; sample type 2 |
| Sum of σ5 values | | 170 to 220 | 175 to 210 | 180 to 220 | N/mm² | ISO527-1 and ISO 527-3; sample type 2 |
| Density | | <1395 | <1392 | <1390 | kg/m³ | ASTM D1505-68, method C |
| Haze of film | | <2.0 | | | | ASTM D1003-61, method A |

TABLE 1-continued

| | | Inventive range | Preferred | More preferred | Unit | Test method |
|---|---|---|---|---|---|---|
| Clarity of film | | ≥85 | | | | ASTM D1003 |
| Gloss of film | | ≥140 | | | N/15 mm | DIN 67530 |
| Transparency of film | | ≥89 | | | | DIN 1033-77 |
| SV value of film | | 680 to 1000 | 710 to 950 | 740 to 900 | | |
| Puncture resistance/thickness of film | | 0.35 d | | | N/μm | EN 14447 |
| Thermoformability (format according to FIG. 3) | Depth | ≥70 | ≥73 | ≥76 | mm | |
| | Atotal/Afilm | ≥2.5 | ≥2.6 | ≥2.7 | | |
| Thickness of film | | 50 to 300 | 51 to 200 | 52 to 200 | μm | |

(II) Upper Film (B)=Sealable Polyester Film

The packaging according to the present invention moreover comprises an upper film (B) comprised of a transparent, biaxially oriented and coextruded, heat-sealable and peelable polyester film (B' B" B'''; see below for explanation) or (B' B" B'''; see below for explanation). The outer layer (B') is comprised mainly of, i.e. of at least 60% by weight of, polyesters.

Outer Layer (B')

Polymers for the Amorphous Outer Layer (B')

According to the invention, the heat-sealable outer layer (B') comprises at least one polyester and optionally an antiblocking agent. The polyester is comprised of units derived from aromatic and aliphatic dicarboxylic acids. The quantity of the units based on the aromatic dicarboxylic acids is 25 to 95 mol % in the polyester, preferably 40 to 90 mol %, particularly preferably 50 to 88 mol %. The quantity of the units based on the aliphatic dicarboxylic acids is 5 to 75 mol % in the polyester, preferably 10 to 60 mol %, particularly preferably 12 to 50 mol %, where the total of the mol % data is always 100%. The diol units corresponding thereto likewise always give 100 mol %.

Examples of the aromatic dicarboxylic acids that can be used according to the invention are terephthalic acid, isophthalic acid, phthalic acid and naphthalene-2,6-dicarboxylic acid.

Examples of aliphatic dicarboxylic acids are succinic acid, glutaric acid, adipic acid, pimelic acid, suberic acid, azelaic acid and sebacic acid. According to the invention, it is preferably possible to use adipic acid and sebacic acid, and less preferably possible to use succinic acid, glutaric acid, adipic acid, pimelic acid, suberic acid and azelaic acid.

Examples of the aliphatic diols that can be used according to the invention are ethylene glycol, 1,3-propanediol, 1,3-butanediol, 1,4-butanediol, 1,5-pentanediol, 2,2-dimethyl-1,3-propanediol, diethylene glycol, triethylene glycol, cyclohexane-1,4-dimethanol and neopentyl glycol.

In the preferred embodiment, the polyester includes the following dicarboxylates and alkylenes, based in each case on the total quantity of dicarboxylate and, respectively, total quantity of alkylene:

25 to 95 mol %, preferably 30 to 90 mol % and particularly preferably 40 to 70 mol %, of terephthalate,
0 to 25 mol %, preferably 5 to 20 mol % and particularly preferably 10 to 20 mol %, of isophthalate,
5 to 75 mol %, preferably 3 to 70 mol % and particularly preferably 11 to 65 mol %, of sebacate,
0 to 50 mol %, preferably 0 to 40 mol % and particularly preferably 0 to 30 mol %, of adipate,
more than 30 mol %, preferably more than 40 mol % and particularly preferably more than 50 mol %, of ethylene or butylene.

The outer layer material optionally comprises up to 15% by weight of a polymer that is incompatible with polyester (anti-PET polymer). In a preferred embodiment, the proportion of anti-PET polymer is 2 to 12% by weight, preferably 2 to 10% by weight and particularly preferably 2 to 8% by weight.

Up to 10% by weight of the material of the outer layer (B') consists of particles, additives, auxiliaries and/or other additional substances usually used in polyester film technology.

The polyester for the outer layer (B') is preferably produced from two physically miscible polyesters I and II, and particularly preferably from three physically miscible polyesters I, II and III; these are introduced in the form of mixture to the extruder for this layer (B').

Polyester I for the Outer Layer (B')

The proportion, in the outer layer (B'), of the polyester I which consists of one or more aromatic dicarboxylates and of one or more aliphatic alkylenes is 10 to 60% by weight. In the preferred embodiment, the proportion of the polyester I is 15 to 55% by weight, and in the particularly preferred embodiment it is 20 to 50% by weight.

In the preferred embodiment, the polyester I of the outer layer (B') according to the invention is based on the following dicarboxylates and alkylenes, based in each case on the total quantity of dicarboxylate and, respectively, total quantity of alkylene:

60 to 100 mol %, preferably 62 to 95 mol % and particularly preferably 66 to 93 mol %, of terephthalate,
0 to 40 mol %, preferably 5 to 38 mol % and particularly preferably 7 to 34 mol %, of isophthalate, where the mol % data of the stated dicarboxylic acids always give a total of 100%,
more than 50 mol %, preferably more than 65 mol % and particularly preferably more than 80 mol %, of ethylene units.

Any residual fractions that may be present derive from other aromatic dicarboxylic acids and other aliphatic diols, as listed as most suitable other aromatic dicarboxylic acids for the base layer (B").

Very particular preference is given to copolyesters in which the proportion of terephthalate units is 60 to 80 mol %, the corresponding proportion of isophthalate units is 20 to 40 mol %, and the proportion of ethylene units is 100 mol %. The material is therefore an ethylene terephthalate-ethylene isophthalate copolymer.

It has been found that if the proportion of polyester I in the outer layer (B') is below 10% by weight, the film becomes significantly less amenable to production by way of coextrusion, or there is no longer any certainty that this can be achieved. The tendency of the film here to adhere on particular machine components, in particular on metallic rolls, is particularly high. If on the other hand, in contrast, the proportion of polyester I in the outer layer (B') is above 60% by weight, the sealing performance of the film is severely impaired for the present application. Because of the melting point increase associated therewith, the sealable layer (B') no longer has, at the sealing temperatures usually used, the desired softness required for the desired sealing (sometimes through partial contamination).

According to the invention, the SV value of the raw material here is above 600, preferably above 650 and particularly preferably above 700. If the SV value of the raw material is below 600, the raw material becomes more difficult to extrude; this is undesirable.

Polyester II for the Outer Layer (B')

According to the present invention, the proportion of polyester II in the outer layer (B') is 20 to 70% by weight. In the preferred embodiment, the proportion of polyester II is 25 to 65% by weight, and in the particularly preferred embodiment it is 30 to 60% by weight.

Polyester II preferably consists of a copolymer made of aliphatic and aromatic acid components, where the aliphatic acid, components amount to 20 to 90 mol %, preferably 30 to 70 mol % and particularly preferably 35 to 60 mol %, based on the total quantity of acid in the polyester II. The balancing proportion of dicarboxylate to give 100 mol % derives from aromatic acids specifically terephthalic acid and isophthalic acid, terephthalic acid being mentioned here with preference and isophthalic acid being mentioned here with less preference, and also, on the glycolic side, from aliphatic, cycloaliphatic or aromatic diols as described in relation to the base layer.

The polyester II of the outer layer (B') according to the invention is based at least on the following dicarboxylates and alkylenes, based in each case on the total quantity of dicarboxylate and, respectively, total quantity of alkylene:
  20 to 70 mol %, preferably 30 to 70 mol % and particularly preferably 35 to 60 mol %, of sebacate,
  0 to 50 mol %, preferably 0 to 45 mol % and particularly preferably 0 to 40 mol %, of adipate,
  10 to 80 mol %, preferably 20 to 70 mol % and particularly preferably 30 to 60 mol %, of terephthalate,
  0 to 30 mol %, preferably 3 to 25 mol % and particularly preferably 5 to 20 mol %, of isophthalate, where the mol % data of the dicarboxylic acids stated always give a total of 100%,
  more than 30 mol %, preferably more than 40 mol % and particularly preferably more than 50 mol %, of ethylene or butylene.

In the preferred embodiment, the polyester II of the outer layer (B') according to the invention is based at least on the following dicarboxylates and alkylenes, based in each case on the total quantity of dicarboxylate and, respectively, total quantity of alkylene:
  20 to 70 mol %, preferably 30 to 65 mol % and particularly preferably 35 to 60 mol %, of sebacate,
  10 to 80 mol %, preferably 20 to 70 mol % and particularly preferably 30 to 60 mol %, of terephthalate,
  0 to 20 mol %, preferafoly 3 to 15 mol % and particularly preferably 3 to 10 mol %, of isophthalate,
  more than 30 mol %, preferably more than 40 mol % and particularly preferably more than 50 mol %, of ethylene or butylene.

Any remaining fractions that may be present derive from other aromatic dicarboxylic acids and other aliphatic diols as listed for the base layer (B").

The presence of at least 10 mol % of aromatic dicarboxylic acid ensures that the polymer II can be processed without sticking, e.g. in the coextruder or during longitudinal stretching.

If the proportion of polyester II in the outer layer (B') is below 20% by weight, the sealing and peeling performance of the film is severely impaired. The sealable layer then—as already described above—no longer has, at the usual sealing temperatures, the desired softness required for good sealing (sometimes through partial contamination). If, in contrast, the proportion of polyester II in the outer layer (B') is more than 70 by weight, the film becomes less amenable to production by way of coextrusion, or there is no longer any certainty that this can be achieved. The tendency of the film here to adhere on particular machine components, in particular on metallic rolls, is particularly high.

According to the invention, the SV value of the raw material here is above 900, preferably above 950 and particularly preferably above 1000. If the SV value of the raw material is below 900, the haze of the film increases; this is undesirable.

Polyester III for the Outer Layer (B')

The proportion of the polyester III, which consists of one or more aromatic dicarboxylates and of one or more aliphatic alkylenes, as 0 to 15% by weight in the outer layer (B'), and is optional. In the preferred embodiment, the proportion of the polyester III is 3 to 12% by weight, and in the particularly preferred embodiment it is 4 to 10% by weight.

The polyester III of the outer layer (B') according to the invention is generally based on the following dicarboxylates and alkylenes, based in each case or the total quantity of dicarboxylate and, respectively, total quantity of alkene:
  80 to 90 mol %, preferably 82 to 96 mol % and particularly preferably 74 to 95 mol %, of terephthalate,
  2 to 20 mol %, preferably 4 to 18 mol % and particularly preferably 5 to 17 mol %, of isophthalate,
  more than 50 mol %, preferably more than 65 mol % and particularly preferably more than 80 mol %, of ethylene units.

Any remaining polymeric fractions that may be present derive from other aromatic dicarboxylic acids and other aliphatic diols, as already listed above as most suitable other aromatic dicarboxylic acids for the base layer (B").

Care must be taken to ensure that in the mixture of the polyesters I, II and III the proportions in % by weight give a total of 100.

Very particular preference is given to copolyesters in which the proportion of terephthalate units is 84 to 94 mol %, the corresponding proportion of isophthalate units is 6 to 16 mol % (where the proportions of dicarboxylate again give a total of 100 mol %), and the proportion of ethylene units is 100 mol %. The material is therefore again a polyethylene terephthalate/isophthalate.

In a particularly preferred embodiment, the polyester III comprises a proportion of 5 to 25% by weight of a suitable antiblocking agent (see further below). In this preferred embodiment, polyester III is a masterbatch which preferably is produced by way of extrusion technology. The concentration at which the antiblocking agent here is added to the polyester raw material during extrusion (preferably in a twin-screw extruder) is significantly higher than that at which it is present subsequently in the film. According to the invention, the SV value of the masterbatch here is above 400, preferably above 425 and particularly preferably above 450.

It is preferable that the outer layer (B') comprises a mixture of the polyesters I, II and III. A mixture has the following advantages in comparison with the use of only one polyester with comparable components and comparable proportions of the components:

In terms of the respective glass transition temperatures ($T_g$), the mixture of the two polyesters I and II is easier to extrude than a single raw material with comparable concentration of the respective polymer components. Studies have revealed that a mixture of polymers with high $T_g$ (polyester I and III) with a polymer with low $T_g$ (polyester II) has less tendency to sticking in the coextruder than a single polymer with a corresponding average $T_g$.

In practical terms, with the mixture it is possible to achieve greater individuality of setting of the desired sealing and peeling properties than with use of a single polyester.

In particular, addition of particles is found to be easier in the case of polyester III than in the case of polyester I or II.

The glass transition temperature of polyester I is advantageously above 50° C. The glass transition temperature of polyester I and III is preferably above 55° C. and particularly preferably above 60° C. If the glass transition temperature of polyester I and III is below 50° C., the film cannot be produced in a reliable process. The tendency of the outer layer (B') to adhere, for example in relation to rolls, is so great here that frequent film break-offs must be expected.

The glass transition temperature of polyester II is advantageously below 10° C. The glass transition temperature is preferably below 8° C. and particularly preferably below 6° C. If the glass transition temperature of polyester II is above 10° C., the sealable layer no longer has, at the usual sealing temperatures, the desired softness required for sealing (sometimes through partial contamination).

Anti-PET Polymer in the Outer Layer (B')

The heat-sealable and peelable outer layer (B') optionally comprises a polymer incompatible with polyester (anti-PET polymer) at a particular concentration. The proportion of the anti-PET polymer is 0 to 15% by weight, based on the composition of the outer layer (B'). In a preferred embodiment, the proportion of the anti-PET polymer is 2 to 10% by weight, and in the particularly preferred embodiment it is 2 to 8% by weight, likewise based on the composition of the outer layer (B').

Examples of incompatible polymers (anti-PET polymer) are polymers based on ethylene (e.g. LLDPE, HDPE), propylene (PP), cycloolefins (CO), amides (PA) or styrene (PS). In a preferred embodiment, a copolymer is used as polyester-incompatible polymer. Examples here are copolymers based on ethylene (C2/C3, C2/C3/C4 copolymers), propylene (C2/C3, C2/C3/C4 copolymers), butylene (C2/C3, C2/C3/C4 copolymers) or based on cycloolefins (norbornene/ethylene copolymers, tetracyclododecene/ethylene copolymers). In one of the particularly preferred embodiments, the polymer incompatible with polyester (anti-PET polymer) is a cycloolefin copolymer (COC). These cycloolefin copolymers are described by way of example in EP-A 1 068 949, whose United States equivalent is U.S. Pat. No. 6,641,924 or JP 05-009319, each of which is hereby incorporated herein by way of reference.

Among the cycloolefin copolymers, preference is in particular given to those that comprise polymerized units of polycyclic olefins having fundamental norbornene structure, particularly preferably norbornene or tetracyclododecene. Particular preference is given to cycloolefin copolymers (COC) which contain polymerized units of acyclic olefins, in particular ethylene. Very particular preference is given to norbornene/ethylene copolymers and tetracyclododecene/ethylene copolymers which comprise 5 to 80% by weight of ethylene units, preferably 10 to 60% by weight of ethylene units (based on the weight of the copolymer).

The glass transition temperatures of the COCs are generally between −20 and 400° C. COCs suitable for the invention are those with glass transition temperature below 120° C., preferably below 100° C. and particularly preferably below 80° C. The glass transition temperature should preferably be above 50° C., with preference above 55° C., in particular above 60° C. Viscosity number (decalin, 135° C., DIN 53 728) is advantageously between 0.1 and 200 ml/g, preferably between 50 and 150 ml/g.

Films comprising a COC with glass transition temperature below 80° C. feature lower haze and better sealability than films comprising a COC with a glass transition temperature above 80° C.

EP-A-0 263 164, EP-A-0 407 870, EP-A-0 405 893 and EP-A-0 503 422 describe the production of cycloolefin copolymers (COCs) with catalysts based on soluble metallocene complexes. It is particularly preferable to use cycloolefin copolymers produced with catalysts based on soluble metallocene complexes. These COCs are obtainable commercially; for example TOPAS® (Ticona, Frankfurt).

Addition of the anti-PET polymer improves sealing and improves processing performance, in particular here the winding of the film according to the invention. If the proportion of the COC, in the preferred embodiment is below 2% by weight, there is no longer any advantageous effect of the polymer on sealing and on the processing performance of the tray. The tray tends to block. On the other hand, the proportion of the polyester-incompatible polymer should not exceed 15% by weight, because otherwise the haze of the film becomes excessive.

Antiblocking Agent in the Outer Layer (B')

In order to achieve good self-venting of the heat-sealable and peelable outer layer (B'), good processability of the upper film (B'), and also to improve the performance of the upper film (B) during peeling from the tray (produced from lower film (A) by thermoforming) after cooking, it is advantageous according to the invention to use suitable antiblocking agents (=particles) for further modification of the heat-sealable and peelable outer layer (B').

For good self-venting of the heat-sealable and peelable outer layer (B'), the diameter $d_{50}$ of the particles must be within a range according to the invention. It has proved here to be particularly advantageous to use particles with median diameter $d_{50}$ 1.5 to 5.0 μm, preferably 1.5 to 4.5 μm and particularly preferably 1.5 to 4.0 μm. If particles with diameter below 1.5 μm are used, there is no advantageous effect of the particles on self-venting and on the peel performance of the outer layer (B'). During peeling from the tray after cooking, the film has a tendency towards tearing or tear-propagation; this is undesirable. Particles with a diameter above 5.0 μm generally cause excessive haze and inadequate gloss of the film, and also filter problems.

For provision of the desired good self-venting, good peel performance, good winding and good processability of the film, it has proved advantageous for the heat-sealable and peelable outer layer (B') to comprise particles at a concentration above 0.04% by weight, preferably above 0.05% by weight and particularly preferably above 0.06% by weight. The maximal concentration of the particles is 10.00% by weight, preferably 8.00% by weight and particularly preferably 6.00% by weight. If the outer layer (B') comprises particles at a concentration below 0.04% by weight, there is no longer any favourable effect on self-venting. If the outer layer (B') comprises particles at a concentration above 10% by weight, the haze of the film becomes excessive.

In a preferred embodiment, the particle diameter $d_{50}$ in the heat-sealable and peelable outer layer (B') is greater than the thickness of this layer. Compliance with a particle diameter/layer thickness ratio above 1.0, preferably above 1.1 and particularly preferably above 1.2 has proved advantageous according to the invention. In these cases there is a particularly advantageous effect of the particles on self-venting and on the performance of the film in peeling from the tray after cooking.

Particles preferred according to the invention are synthetic, amorphous $SiO_2$ particles in colloidal form, which can be bound in excellent manner into the polymer matrix. In relation to production of the $SiO_2$ particles, reference is made to the prior art; the process is disclosed in detail by way of example in EP 1 475 228 B1.

Typical other particles that can be used in the outer layer (B') are inorganic and/or organic particles, for example calcium carbonate, talc, magnesium carbonate, barium carbonate, calcium sulfate, barium sulfate, lithium phosphate, calcium phosphate, magnesium phosphate, aluminium oxide, LiF, the calcium, barium, zinc or manganese salts of the dicarboxylic acids used, titanium dioxide or kaolin.

Thickness of the Outer Layer (B')

According to the invention, the thickness of the heat-sealable and peel able outer layer (B') is 1.5 to 5 μm. If the thickness of the outer layer (B') is below 1.5 μm, sealing of the upper film (B') to the lower film (A) is inadequate. If the thickness of the outer layer is above 5 μm, self-venting of the pack becomes impaired; this is undesirable.

The outer layer (B') exhibits good sealing properties in relation to itself (fin sealing, outer layer (B') in relation to outer layer (B')), and in particular good sealing and peeling properties in relation to the lower film (A). After heat-sealing at 160° C. (460 N, 2 s), the seal seam strength of the outer layer (B') in relation to itself (fin sealing) and in relation to the lower film (A) is above 2 N/15 mm, and is at most 10 N/15 mm. In all cases here, peelable sealing is achieved in relation to the lower film (A), even in cases where the film has been partially contaminated with meat juices or the like.

Base Layer (B")

Polymers Used for the Base Layer (B")

The base layer (B") of the upper film (B) consists of at least 90% by weight of a thermoplastic polyester which is comprised of dicarboxylic-acid-derived units and of diol-derived units, or of dicarboxylates and of alkylenes, and which generally comprises the following dicarboxylates and alkylenes, based in each case on the total quantity of dicarboxylate and, respectively, the total quantity of alkylene:

more than 90 mol % of terephthalate, preferably more than 95 mol %,
more than 90 mol % of ethylene, preferably more than 95 mol %.

Examples of other aliphatic diols suitable for forming the polyester are diethylene glycol, triethylene glycol, aliphatic glycols of the general formula HO—$(CH_2)_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms. Suitable other aromatic dials have by way of example the formula HO—$C_6H_4$—X—$C_6H_4$—OH, where X is —$CH_2$—, —$C(CH_3)_2$—, —$C(CF_3)_2$—, —O—, —S— or —$SO_2$—.

Other aromatic dicarboxylic acids are preferably benzenedicarboxylic acids, naphthalenedicarboxylic acids, for example naphthalene-1,4- or -1,6-dicarboxylic acid, biphenyl-x,x'-dicarboxylic acids, in particular biphenyl-4,4'-dicarboxylic acid, diphenylacetylene-x,x'-dicarboxylic acids, in particular diphenylacetylene-4,4'-dicarboxylic acid, or stilbene-x,x'-dicarboxylic acids. Among the cycloaliphatic dicarboxylic acids, mention may be made of cyclohexanedicarboxylic acids, in particular cyclonexane-1,4-dicarboxylic acid. Among the aliphatic dicarboxylic acids, the ($C_3$-$C_{19}$) alkanediacids are particularly suitable, where the alkane moiety can be straight-chain or branched.

The polyesters for the base layer (B") can by way of example be produced by the transesterification process. This starts from dicarboxylic esters and diols, which are reacted with the conventional transesterification catalysts, for example zinc salts, calcium salts, lithium salts, magnesium salts and manganese salts. The intermediates are then polycondensed in the presence of well-known polycondensation catalysts, for example antimony trioxide or titanium, aluminium or germanium salts. Successful production can equally be achieved by the direct esterification process in the presence of polycondensation catalysts. This starts directly from the dicarboxylic acids and the diols.

It has proved to be particularly advantageous to polycondense the intermediates in the presence of titanium dioxide or germanium compounds, or to carry out the direct esterification process in the presence of polycondensation catalysts such as titanium dioxide or germanium compounds. The biaxially oriented polyester film is then antimony-free. In the particularly preferred case, the desired product is a biaxially oriented polyester film which comprises no antimony and therefore can be used in packing or packaging applications where the film has direct contact with food.

The base layer (B") can additionally comprise conventional additives, for example stabilizers (UV, hydrolysis), and in particular heat stabilizers (e.g. Irganox 1010) or other fillers (e.g. colour pigments) in the concentrations recommended by the manufacturer. These additives are advantageously added to the polymer or, respectively, polymer mixture before melting.

The base layer (B") additionally comprises regrind, a quantity of up to 60% by weight of which is introduced into the extrusion procedure during production of the film without any significant resultant adverse effect on the physical, and in particular the optical, properties of the film.

Radical-Scavengers in the Film

As described above for the lower film, the upper film is also subject to relatively high thermal stress during what is known as the cook-in process.

This procedure results in a low level of thermal stress across a large part of the area of the film. The film is subjected to significantly increased thermal stress only in the edge region of the pack, and in particular at the corners of the pack (sealed edge). While evaporation of water ensures that the remainder of the thermoformed film experiences temperatures significantly below 160° C., the corner region of the pack is exposed to oven temperature (e.g. 220° C.) for the entire cooking time.

In extreme cases here, the corner region of the film is subject to thermal stress at a temperature of 220° C. for more than 2 h, and at this elevated temperature oxygen can penetrate into the polymer.

A possible consequence of this is embrittlement of the pack or packaging, and therefore of the film, in particular at the corners, and a tendency towards splintering. This is extremely undesirable and must be avoided.

As described for the film (A), the base layer (B") also preferably comprises one or more radical-scavengers if increased heat resistance is required. The radical-scavenger(s) is/are preferably based on phenolic antioxidants.

Surprisingly, it has been found that the film comprising one or more radical-scavengers exhibits significantly increased heat resistance, and that therefore packs or packaging produced therefrom can remain for more than one hour in an oven at temperatures above 220° C. without resultant embrittlement.

In a preferred embodiment, the film according to the present invention comprises 400-2000 ppm of a radical-scavenger, the content preferably being 500-2500 ppm and with particular preference between 700 and 2000 ppm.

Contents below 400 ppm tend to lead to failure in the oven (=splintering), and contents higher than 2000 ppm have no further improving effect on the film and therefore merely reduce cost-effectiveness, and can lead to migration of the stabilizer out of the film into a packed or packaged food. Contents above 2000 ppm moreover tend to lead to formation of gels and to an undesired yellow tinge of the film.

The radical-scavenger used can be either one compound (preferably) or else a mixture of various radical-scavengers. The radical-scavenger(s) used is/are preferably selected from the group of the phenolic antioxidants.

Preferred radical-scavengers are pentaerythritol tetrakis [3-(3,5-di-tert-butyl-4-hydroxyphenyl)propionate] (CAS No. 6683-19-8) and 1,3,5-trimethyl-2,4,6-tris(3,5-di-tert-butyl-4-hydrozybenzyl)benzene) (CAS No. 1709-70-2) obtainable from BASF with trade names IRGANOX® 1010 and IRGANOX® 1330.

The effectiveness of the radical-scavenger can be tested directly on the pack or packaging, e.g. after removal of the pack or packaging from the oven. The pack or packaging is described here as good (i.e. suitable for the application) if no splintering is observed anywhere in the film according to the present invention.

Structure of the Upper Film (B)

The heat-sealable and peelable upper film (B) according to the invention can have a two- or three-layer structure. A three-layer structure of the upper film (B) with the layers B'B"B'" has proved to be advantageous for achieving the abovementioned properties, in particular the very good optical properties required. The upper film (B) according to the invention then comprises the base layer B", the heat-sealable and peelable outer layer B' on one side of the base layer B", and the outer layer B'" on the other side of the base layer B".

The thickness of the outer layer B'" is generally between 0.5 and 3 μm, and this layer preferably consists of the polyester that is also used in the base layer (B").

Thickness of the Upper Film (B)

The total thickness of the polyester film (B) according to the invention can vary within particular boundaries. It is 20 to 125 μm, preferably 25 to 100 μm and particularly preferably 30 to 75 μm. If the thickness of the film (B) is below 20 μm, the mechanical properties and barrier properties of the film are inadequate. However, if the thickness of the film (B) is above 125 μm, the sealability of the film is impaired and moreover production of the film becomes uneconomic; both of these outcomes are undesirable.

Process for the Production of the Upper Film (B)

The invention also provides a process for the production of the polyester film (B) according to the invention, by the coextrusion process known from the literature.

The procedure for the purposes of the said process is that the melts corresponding to the individual layers (B'B" and, if present, B'") of the upper film (B) are coextruded through a flat-film die, the resultant film is drawn off on one or more rolls for solidification, the film is then biaxially stretched, and the biaxially stretched film is heat-set.

Biaxial orientation is carried out sequentially. It is preferable here to begin by orienting in longitudinal direction (i.e. in machine direction) and then to orient in transverse direction (i.e. perpendicularly to machine direction). The orientation in longitudinal direction can be achieved with the aid of a plurality of rolls rotating at different speeds corresponding to the desired stretching ratio. The transverse orientation is generally achieved by using an appropriate tenter frame.

The process begins, as is conventional in the coextrusion process, by compressing and plastifying the polymers or polymer mixtures for the individual layers in respective extruders; the additives optionally additionally provided here can already be present in the polymer or in the polymer mixture. The melts are simultaneously forced through a flat-film die, and the extruded multilayer melt is drawn off on one or more draw-off rolls, whereupon the melt cools and solidifies to give a prefilm.

The temperature at which stretching is carried out can vary within a relatively wide range, and depends on the desired properties of the film. The longitudinal stretching is generally carried out at a temperature in the range 80 to 130° C., and the transverse stretching is generally carried out at a temperature in the range 90 to 150° C. The longitudinal stretching ratio is generally in the range 2.5:1 to 6:1, preferably 3.0:1 to 5.5:1. The transverse stretching ratio is generally in the range 3.0:1 to 5.0:1, preferably 3.5:1 to 4.5:1.

In the heat-setting that follows, the film is kept at a temperature of about 160 to 240° C. for a period of about 0.1 to 15 s. This is followed by conventional wind-up of the film.

Properties According to the Invention

The heat sealable and peelable polyester film (B) according to the invention, produced by the process according to the invention, has a number of properties; the most important of these are listed below.

The haze of the heat-sealable and peelable polyester film (B) is below 20.0%. Haze of the polyester film is preferably below 16.0% and particularly below 12.0%.

The clarity of the heat-sealable and peelable polyester film (B) is above 70%. Clarity of the polyester film is preferably above 75% and particularly preferably above 80%.

The transparency of the heat-sealable and peelable polyester film (B) is above 88. Transparency is preferably above 89 and particularly preferably above 90.

The gloss of the heat-sealable and peelable polyester film (B) is above 70; in the preferred embodiment it is above 75, and in the particularly preferred embodiment it is above 80.

The outer layer (B') exhibits good sealing properties in relation to itself, and in particular good sealing and peeling properties in relation to the lower film (A). The film exhibits good adhesion on the abovementioned materials at a sealing temperature that is significantly below the melting point of the base layer (B"). After sealing at 160° C. (460 N 2 s), the seal seam strength of the outer layer (B') in relation to itself and in relation to the lower film (A) is above 2 N/15 mm, and is at most 10 N/15 mm. In all cases here, peelable sealing is achieved in relation to the lower film (A) (at least in respect of peeling of the film after cooking).

The polyester film (B) features very good winding performance.

The polyester film (B) has excellent suitability for the packing or packaging of foods and of other consumable items, in particular for the packing or packaging of foods and other consumable items in trays where heat-sealable and peelable polyester films are used to open the pack or packaging.

Table 2 collates inter alia the most important film properties according to the invention.

this procedure. This is achieved in that the polymer of the outer layer (B') generally has a significantly lower melting or softening point than the polymer of the base layer (B"). If, by way of example, polyethylene terephthalate with melting point 254° C. is used as polymer for the base layer, the melting point of the heat-sealable outer layer (B') is generally significantly below 220° C. In the present case, the main polymer for the sealable outer layer (B') of the upper film is almost 100% amorphous.

The term "peelable" means that a polyester film comprising at least one heat-sealable and peelable outer layer (B') has the property that allows it, after heat-sealing on APET/RPET trays and CPET trays, to be peeled away again from the tray without any resultant tearing or break-off of the film. When the film is peeled from the tray, the composite comprised of heat-sealable and peelable film and tray generally parts at the seam between the heat-sealable layer and the tray surface (cf. also Ahlhaus, O. E.: Verpackung mit

TABLE 2

| | Outer layer (B') | | | | |
|---|---|---|---|---|---|
| | Inventive range | Preferred | More preferred | Unit | Test method |
| Proportion of units based on aromatic dicarboxylic acids in the polyester according to the invention | 25 to 95 | 40 to 90 | 50 to 88 | Mol. % | |
| Proportion of units based on aliphatic dicarboxylic acids in the polyester according to the invention | 5 to 75 | 10 to 60 | 12 to 50 | Mol. % | |
| Anti-PET polymer | up to 15 | 2 to 12 | 2 to 8 | % by wt. | |
| Polyester I | 10 to 60 | 15 to 55 | 20 to 50 | % by wt. | |
| Polyester II | 20 to 70 | 25 to 65 | 30 to 60 | % by wt. | |
| Polyester III | up to 15 | 3 to 12 | 4 to 40 | % by wt. | |
| Particle diameter $d_{50}$ | 1.5 to 5.0 | 1.5 to 4.5 | 1.5 to 4.0 | μm | internal |
| Filler concentration | 0.04 to 10.0 | 0.05 to 8.0 | 0.06 to 6.0 | % | internal |
| Thickness of outer layer B' | 1.5 to 5.0 | 1.6 to 5.0 | 1.7 to 50 | μm | |
| Particle diameter/layer thickness ratio | >/=1.0 | >/=1.1 | >/=1.2 | | |
| Properties | | | | | |
| Thickness of film | 20 to 125 | 25 to 100 | 30 to 75 | μm | |
| Seal seam strength (B') in relation to itself and in relation to lower film (A) | 2.0 to 10 | 2.0 to 8 | 2.0 to 6 | N/15 mm | Internal |
| Gloss of outer layers B' and B''' | >70 and >100 | >75 and >110 | >80 and >120 | | DIN 67530 |
| Haze of film | <20 | <16 | <12 | % | ATSM D1003-61, method A |
| Clarity of film | >70 | >75 | >80 | % | ASTM D1003 |
| Transparency of film | >88 | >89 | >90 | | DIN 1033-77 |

OL: outer layer, >/= greater, equal to

Definitions

Figure 2:
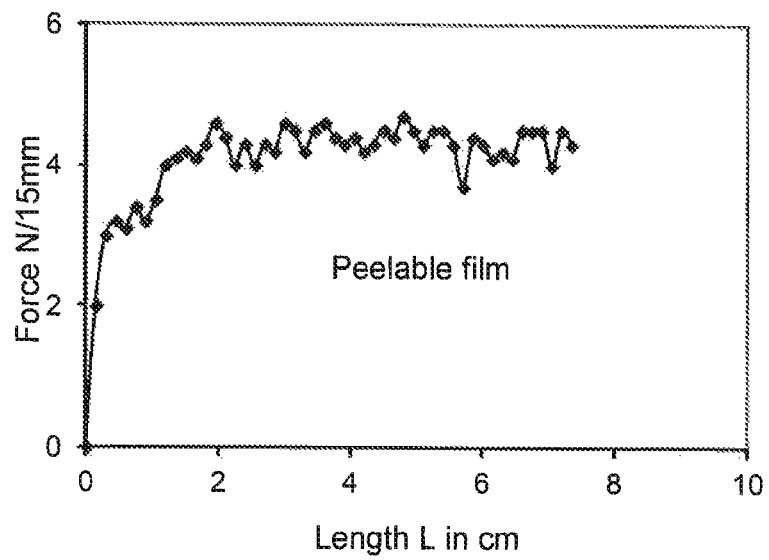
FIG. 2 is a graphical illustration of the tensile strain behaviour of an exemplary inventive film.

The expression "heat-sealable" means in general terms the property possessed by a multilayer polyester film comprising at least one base layer (B) and comprising at least one heat-sealable outer layer (B'). The heat-sealable outer layer (B') is bonded to a substrate made of thermoplastic, for example trays made of polyester or of APET, by means of sealing jaws through application of heat (110 to 220° C.) and pressure (1 to 6 bar) within a predefined period (0.1 to 4 sec); the base layer (B) itself does not develop plasticity during Kunststoffen [Packaging with plastics], Carl Hanser Verlag, F. 271, 1997, ISBN 3-446-17711-6). When the film heat-sealed to a test strip of the tray is peeled in tensile-strain-testing equipment at a peel angle of 180° according to FIG. 1, tensile strain behaviour according to FIG. 2 is obtained from the film. On commencement of peeling of the film from the substrate, the force required for this purpose increases according to FIG. 2 up to a particular value (e.g. 5 N/15 mm), and then remains approximately constant over the entire peel distance, but is subject to relatively large variations (about +/−20%).

The following test methods were used to characterize the raw materials and the films for the purposes of the present invention.

Test Methods

Modulus of Elasticity

Modulus of elasticity is determined in accordance with DIN EN ISO 572-1 and -3 (type 2 test sample)) on film strips measuring 100 mm×15 mm. Area modulus of elasticity is calculated according to the following formula:

$$E_{area} = \sqrt{(E_{MD}^2 + E_{TD}^2)}.$$

$\sigma_5$ Value

The $\sigma_5$ value is determined in accordance with DIN EN ISO 572-1 and -3 (type 2 test sample) on film strips measuring 100 mm×15 mm.

Density

The density of the film is determined in accordance with ASTM D1505-68, Method C.

Haze, Clarity and Transparency

A HAZE-GARD® XL-211 haze meter from BYK Gardner is used to test the polyester films. Haze is determined in accordance with ASTM D1003-61, Method A. Clarity is measured in accordance with ASTM D1003 by means of a HAZE-GARD®, but this time using the "clarity port" of the test equipment. Transparency is measured in accordance with ASTM D1003-61, Method A. All of the measurements are made on the film directly after production.

20° Gloss

Gloss is determined in accordance with DIN 67530. The reflectance value is measured as optical variable representing the surface of a film. Using a method based on the standards ASTM D523-78 and ISO 2813, the angle of incidence is set to 20°. A light beam impacts the flat test surface at the set angle of incidence and is reflected or scattered thereby. Light impacting the photoelectronic detector is indicated in the form of a proportional electrical variable. The value measured is dimensionless, and must be stated together with the angle of incidence.

Standard Viscosity SV

Standard viscosity in dilute solution SV was measured by a method based on DIN 53 728 Part 3 in an Ubbelohde viscometer at (25±0.05)° C. Dichloroacetic acid (DCA) was used as solvent. The concentration of the dissolved polymer was 1 g of polymer/100 mL of pure solvent. Dissolution of the polymer took 1 hour at 60° C. If the samples had not dissolved completely after this time, up to two further dissolution attempts were carried out at 80° C. in each case for 40 min, and the solutions were then centrifuged for 1 hour at a rotation rate of 4100 min$^{-1}$.

The dimensionless SV value is determined as follows from the relative viscosity ($\eta_{rel} = \eta/\eta_s$):

$$SV = (\eta_{rel} - 1) \times 1000$$

The proportion of particles in the film or polymer raw material was determined by ashing and corrected by increasing input weight accordingly, i.e.:

$$\text{input weight} = \frac{\text{(input weight corresponding to 100\% of polymer)}}{[(100 - \text{particle content in \% by weight}) \cdot 0.01]}$$

Median Particle Diameter $d_{50}$

Median diameter $d_{50}$ is determined by using a Malvern MASTERSIZER® 2000 on the particle to be used; the relevant value here is the median by volume $d_{v50}$. For this, the samples are placed in a cell with water, and the cell is then placed in the test equipment. A laser is used to analyse the dispersion, and the particle size distribution is determined from the signal via comparison with a calibration curve. The particle size distribution is characterized by two parameters, the median value $d_{50}$ (=measure of position of the central value) and the degree of scattering, the value known as SPAN98 (=measure of scattering of the particle diameter). The measurement procedure is automatic and also includes mathematical determination of the $d_{50}$ value. The $d_{50}$ value is defined here as being determined from the (relative) cumulative particle size distribution curve: The point of intersection of the 50% coordinate value with the cumulative curve provides the desired $d_{50}$ value on the x axis. The relevant value here is the median by volume $d_{v50}$.

Measurements on the film produced by using these particles give a $d_{50}$ value that is lower by 15-25% than that of the particles used.

Puncture Resistance (≈Puncture Test)

Puncture resistance (≈puncture test) is measured in accordance with EN 14477. Exposure to hard, pointed or angular objects is an important factor in the packaging sector. Knowledge of puncture resistance is relevant when the films are used as packing or packaging material, e.g. for foods or for sharp-edged products. The puncture test in accordance with EN 14477 tests performance in relation to a pointed probe with diameter 0.8 mm. This is also known as the Parker pen test.

Determination of Thermoforming Properties

The thermoforming properties of the lower film (A) were determined by thermoforming this film in a Multivac machine (e.g. R245/SN:166619) under the following molding conditions: mold temperatures 210° C., heating time 2-3 s, explosive forming/compressed-air reservoir 2 bar, mold pressure 2 bar, molding time: 2 s). FIG. 3 shows the set formats for the trays to be produced. The two properties that characterize the thermoformability of the film according to the invention are:

Maximal draw depth in mm of the lower film according to the invention (=depth of tray) and Thermoforming ratio $A_{tray}/A_{film}$ ($A_{tray}$=surface area of thermoformed tray, $A_{film}$=surface area of inventive film used).

Determination of Barrier Properties

Water vapour transmission rate (WVTR) was measured on films of varying thickness at 23° C. and 85% r. h. in accordance with ISO 15106-3. Oxygen barrier (OTR) was measured by using an OXTRAN® 100 from Mocon Modern Controls (USA) in accordance with ISO 15105-2, Annex A, 23.0° C./50% r.h. OTR was likewise measured here on films of varying thickness.

Seal Seam Strength (DIN 55529)

The seal seam strength of the upper film (B) in relation to itself was determined by mutually superposing two strips of width 15 mm of the film according to the invention and pressing these together at 200° C. for a period of 3 s, using a "sealing pressure" of 460 N (equipment: Brugger NDS, single-side-heated sealing jaw). In order to avoid sticking on the sealing jaw, a crystalline polyester film of thickness 12 μm was placed between the film according to the invention and the sealing jaw. Seal seam strength (maximal force) was determined with a peel angle of 90° (90° peel method), using a velocity of 200 mm/min.

The seal seam strength of the upper film (B) in relation to the lower film (A) was determined by placing the amorphous side of a film strip of width 15 mm onto a strip of identical size of the lower film (A). Because of the stiffness of the substrate, seal seam strength (maximal force) was measured at a peel angle of 180°. The term sealing is appropriate if the force measured is >1 N/15 mm.

The invention is explained in more detail below with reference to Examples.

Inventive Example 1

I Production of the Thermoformable Lower Film (A)

A biaxially oriented film (A) was produced by the process according to the invention from an ethylene terephthalate-ethylene isophthalate copolymer. The thickness of the film was 96 µm. For this, chips made of the copolymer were introduced into the extruder for production of the lower film. The copolymer was melted and homogenized in the extruder in accordance with the process conditions listed in the table below.

After filtration, the melt was shaped in a flat-film die and discharged by way of the die lip. The melt film was cooled and a transparent single-layer film was produced by way of stepwise orientation in longitudinal and transverse direction, followed by setting.

In order to achieve good winding of the film, a reverse-gravure process was used, between the longitudinal and transverse stretching, to coat the film with an aqueous dispersion. The coating (C) acrylically crosslinked in the tenter frame comprises a 4.5% by weight dispersion of a latex consisting of a copolymer of 60% by weight of methyl methacrylate, 35% by weight of ethyl acrylate and 5% by weight of N-methylolacrylamide and a surfactant. The dry weight of the coating (based on the biaxially oriented film) was about 0.035 g/m².

The composition of the copolymer for the lower film (A) according to the invention is as follows:

89 mol % of ethylene terephthalate units,
11 mol % of ethylene isophthalate units, Production conditions in the individual steps of the process were

| Extrusion | Temperatures for the melt (A) | 270° C. |
|---|---|---|
| | Temperature of draw-off roll | 20° C. |
| Longitudinal stretching | Heating temperature of rolls | 70-90° C. |
| | Stretching temperature of film | 86° C. |
| | Longitudinal stretching ratio | 3.0 |
| Transverse stretching | Temperature of heating fields | 118° C. |
| | Stretching temperature of film | 135° C. |
| | Transverse stretching ratio | 3.4 |
| Setting | Temperature of film | 185° C. |
| | Time | 9 s |

Table 3 presents the composition of the lower film (A), and also further information relating to the film according to the invention, in particular to the properties of the film according to the invention.

II Production of the Heat-Sealable and Peelable Upper Film (B)

The following starting materials were used for the individual coextruded layers (B'B"B''') for the production of the heat-sealable and peelable upper film (B) described below:

Outer layer (B') is a mixture of:
38.0% by weight of polyester I (=copolymer of 78 mol % of ethylene terephthalate, 22 mol % of ethylene isophthalate) with SV value 850. The glass transition temperature of polyester I is about 75° C. Polyester I moreover comprises 5.0% by weight of SYLYSIA® 430 (synthetic $SiO_2$, Fuji, Japan) with particle diameter $d_{50}$=3.4 µm. The ratio of particle diameter $d_{50}$ to outer layer thickness $d_{(A)}$ is 3.4:3.

60% by weight of polyester II (=copolymer comprising 40 mol % of ethylene sebacate, 60 mol % of ethylene terephthalate) with SV value 1000. The glass transition temperature of polyester II is about 0° C.

2% by weight of anti-PET polymer (=COC, TOPAS® 8007, Ticona, Frankfurt; with $T_g$ about 75° C.).

Base Layer B"
100% by weight of polyethylene terephthalate with SV value 800.

Outer Layer B'''
100% by weight of polyethylene terephthalate.
5% by weight of 98.5% by weight of polyethylene terephthalate and 1.5% by weight of SYLOBLOC® 46.

The abovementioned raw materials were melted in an extruder for each layer, and, with the structure A-B-C, extruded through a three-layer flat-film die onto a chilled draw-off roll. The resultant amorphous prefilm was then oriented longitudinally. The film was then stretched transversely, set and rolled up (final film thickness 42 µm). Production conditions in the individual steps of the process were

| Extrusion | Temperatures for the melts (B'B"B''') | 270° C. |
|---|---|---|
| | Temperature of draw-off roll | 20° C. |
| Longitudinal stretching (Spiegel-streckung) | Heating temperature of rolls | 80-120° C. |
| | Stretching temperature | 115° C. |
| | Longitudinal stretching ratio | 4.0 |
| Transverse stretching | Temperature of heating fields | 80-135° C. |
| | Stretching temperature | 135° C. |
| | Transverse stretching ratio | 4.2 |
| Setting | Temperature | 230° C. |
| | Time | 3 s |

Table 4 presents the composition of the film, and also further information relating to the film according to the invention, in particular to the properties of the film according to the invention.

III Production of the Packaging

The lower film (A) and the upper film (B) were respectively separately clamped into a Multivac machine (R 245/SN:166619). The lower film (A) was thermoformed under the following molding conditions: mold temperatures 210° C., heating time 2-3 s, explosive forming/compressed-air reservoir 2 bar, mold pressure 2 bar, molding time: 2 s. FIG. 3 shows the set formats for the trays to be produced. The draw depth of the lower film (A) was up to 75 mm; the thermoforming ratio was up to 2.86.

The mold was cooled, and the thermoformed lower film (A) was ejected from the mold. A portion of pork was placed in the cavity, and the upper film (B) was brought into contact with the upper side of the lower film (A). The manner in which the upper film (B) was brought into contact with the lower film (A) here was such that the heat-sealable and peelable surface (B') of the upper film (B) was in contact with the portion of meat and with the lower film (A).

Heat-sealing was carried out on the same machine at a temperature of 160° C. for 2 s at a pressure of 2 bar. The weight of the portion of meat was about 1000 g. The pack was placed into a conventional oven and cooked for 60 minutes at 220° C. After about 10 min, the desired self-venting was observed. Once the cooking cycle had ended, the upper film (B) was peeled manually from the lower film (A) of the pack; neither of the two films suffered any tearing during this procedure. The meat had been cooked, and was crisp and brown.

Inventive Example 2

The only change made from Inventive Example 1 concerned the production procedure for the lower film (A). Convergence during setting was now 1.75%, having been 0% in Inventive Example 1. The overall result was similar; the puncture resistance of the lower film (A) was slightly increased.

Comparative Example 1

All parameters remained the same as in Inventive Example 1, except that the proportion of isophthalate in the lower film (A) was reduced to 5.0 mol %.

Comparative Example 2

Example 1 from EP 1 697 129 B1 was repeated. Table 4 presents the properties of the film. The laminate is suitable for the applications mentioned in the introduction, but requires improvement in thermoformability and puncture resistance, and especially in optical properties (haze and clarity).

Comparative Example 3

Example 1 from EP 1 945 512 B1 was repeated. The process is suitable for the applications mentioned in the introduction; however, the films described in more detail in EP 1 945 512 B1 require improvement in thermoformability and puncture resistance, and especially in optical properties (haze and clarity).

TABLE 3

| | | Lower film (A) | | | | | | | | | |
|---|---|---|---|---|---|---|---|---|---|---|---|
| | | Composition of polyester for film | | | Modulus of elasticity of film Longitudinal Transverse | Area modulus of elasticity | σ5 value of film Longitudinal Transverse | | Sum of σ5 values | Density | Haze of film | Clarity of film |
| | | TA | IA | EG | | | | | | | | |
| | | Mol-% | | | | N/mm$^2$ | | | | kg/dm$^3$ | % | % |
| Examples | 1 | 89 | 11 | 100 | 3682 | 4117 | 5523 | 98 | 99 | 197 | 1.385 | 0.5 | 100 |
| | 2 | 89 | 11 | 100 | 3843 | 4294 | 5763 | 94 | 103 | 197 | 1.386 | 0.4 | 100 |
| Comparative examples | 1 | 95 | 5 | 100 | 4110 | 4569 | 6146 | 103 | 100 | 203 | 1.392 | 0.4 | 100 |
| | 2 | 76.2 μm PA + 25.4 μm APET | | | | | | | | | | 17 | 75 |
| | 3 | 50 μm Polyester | | | 4175 | 4175 | 5904 | | | | | 5 | |

| | | Gloss of film | | Transparency | SV value of film | Puncture resistance | Thermoformability | | Barrier properties of film (not thermoformed) | | Winding performance |
|---|---|---|---|---|---|---|---|---|---|---|---|
| | | | | | | | Depth | Atray/Afilm | OTR | WVTR | |
| | | Side A | Side B | % | | N/μm | mm | | cm$^3$/(m$^2$ × bar × d) | g/(m$^2$ × d) | |
| Examples | 1 | 203 | 202 | 90.7 | 780 | 0.395 | 75 | 2.88 | 16 | 1.89 | very good |
| | 2 | 204 | 203 | 91 | 777 | 0.398 | 75 | 2.86 | 16 | 1.89 | very good |
| Comparative examples | 1 | 215 | 214 | 91 | 787 | 0.36 | 55 | 2.00 | | | very good |
| | 2 | 74 | 76 | 88 | | | 65 | 2.00 | | | |
| | 3 | 120 | 120 | 90 | | | 55 | 2.00 | | | |

TABLE 4

| | | Composition of polyester I | | | Composition of polyester II | | | | Composition of polyester III | | | Anti-PET polymer | PI/PII/PIII anti-PET polymer ratios | PI/PII/PIII anti-PET polymer glass transition temperatures |
|---|---|---|---|---|---|---|---|---|---|---|---|---|---|---|
| | | TA | IA | EG | | | | | TA | IA | EG | | | |
| | | mol % | | | SeA | TA | IA | EG | mol % | | | COC | % by wt. | ° C. |
| Inventive examples | 1 | 78 | 22 | 100 | 40 | 60 | | 100 | | | | 100 | 38/60/0/2 | 75/−2/—/75 |
| | 2 | 78 | 22 | 100 | 40 | 60 | | 100 | | | | 100 | 38/60/0/2 | 75/−2/—/75 |
| CE | 1 | | | | | | | | | | | | | |

| | | Film structure | Film thickness µm | Outer layer thickness | | Antiblocking agent | | FIN seal seam strength 160° C. | Haze % | Gloss |
|---|---|---|---|---|---|---|---|---|---|---|
| | | | | (B') µm | (B''') µm | diameter µm | concentration % | | | |
| Inventive examples | 1 | B'B''B''' | 42 | 3 | 1.5 | 3.4 | 1.9 | 7 | 13 | 85 |
| | 2 | B'B''B''' | 42 | 3 | 1.5 | 3.4 | 1.9 | 7 | 13 | 85 |
| CE | 1 | B'B''B''' | 42 | 2.7 | 2 | 3 | 0.075 | 3 | 2.5 | 1.68 |

TA terephthalate, IA isophthalate, EG ethylene SeA sebacate

That which is claimed:

1. A transparent packaging for vacuum forming, comprising a biaxially oriented, thermoformable polyester film as lower film (A) and a biaxially oriented polyester film as upper film (B), which is heat-sealable and peelable in relation to the lower film (A), wherein (I) the lower film (A) is a film which comprises at least 85% by weight of a copolyester in which 85 to 94 mol % of the dicarboxylic acid components are based on terephthalic-acid-derived units and 6 to 15 mol % of the dicarboxylic acid components are based on isophthalic-acid-derived units, wherein the film a) has an area modulus of elasticity in the range 4500 to 6400 N/mm$^2$ b) has a sum of strength values ($\sigma_5$ value) in longitudinal direction and in transverse direction in the range 170 to 220 MPa c) has a puncture resistance
F[N]>0.35 d[µm], where d=film thickness d) has a density below 1395 kg/m$^3$ e) has a haze below 2.0% and clarity at least 85% and f) has a thickness in the range 50 to 300 µm, and (II) the upper film (B) is a film which has a base layer (B'') and an outer layer (B') which is heat-sealable and peelable in relation to the lower film (A), wherein the heat-sealable and peelable outer layer (B')

a) is comprised of at least 60% by weight of a polyester which is comprised of 25 to 95 mol % of units based on at least one aromatic dicarboxylic acid and 5 to 75 mol % of units based on at least one aliphatic dicarboxylic acid, wherein the sum of the dicarboxylic-acid-derived molar percentages is 100; and b) comprises up to 10% by weight of inorganic and/or organic particles with median diameter $d_{50}$ 1.5 to 5.0 µm, wherein the ratio of particle size $d_{50}$ to thickness of the outer layer (B') is above 1.0; and c) the thickness of the outer layer (B') is 1.5 to 5.0 µm;

and wherein the upper film (B)

has a haze below 20% and clarity of at least 70%, has a seal seam strength in relation to itself (thin sealing) and in relation to the lower film (A) which is in the range 2 to 10 N/15 mm and has a thickness in the range 20 to 125 µm.

2. The transparent packaging according to claim 1, wherein the lower film (A) and/or the base layer (B'') comprise(s) one or more radical-scavengers.

3. The transparent packaging according to claim 2, wherein the radical-scavenger(s) is a phenolic antioxidant.

4. The transparent packaging according to claim 3, wherein the phenolic antioxidant is selected from the group consisting of pentaerythritol tetrakis[3-(3,5-di-tert-butyl-4-hydroxyphenyl)propionate] and 1,3,5-trimethyl-2,4,6-tris(3,5-di-tert-butyl-4-hydroxybenzyl)benzene).

5. The transparent packaging according to claim 1, wherein the polyester for the outer layer (B') comprises the following dicarboxylates and alkylenes, based in each case on the total quantity of dicarboxylate and, respectively, total quantity of alkylene:

25 to 95 mol % of terephthalate 0 to 25 mol % of isophthalate, 5 to 75 mol % of sebacate, 0 to 50 mol % of adipate; and more than 30 mol % of ethylene or butylene.

6. The transparent packaging according to claim 1, wherein the outer layer (B') has been produced from two physically miscible polyesters I and II.

7. The transparent packaging according to claim 6, wherein the polyester I comprises the following dicarboxylates and alkylenes, based in each case on the total quantity of dicarboxylate and, respectively, total quantity of alkylene:

60 to 100 mol % of terephthalate, 0 to 40 mol % of isophthalate, wherein the mol % data of the dicarboxylic acids mentioned always give a total of 100%, and more than 50 mol % of ethylene units.

8. The transparent packaging according to claim 6, wherein the polyester II comprises the following dicarboxylates and alkylenes, based in each case on the total quantity of dicarboxylate and, respectively, the total quantity of alkylene:
20 to 70 mol % of sebacate,
0 to 50 mol % of adipate,
10 to 80 mol % of terephthalate,
0 to 30 mol % of isophthalate,
wherein the mol % data of the dicarboxylic acids mentioned always give a total of 100%, and
more than 30 mol % of ethylene or butylene.

9. The transparent packaging according to claim 6, wherein the proportion of the polyester I in the outer layer (B') is 10 to 60% by weight.

10. The transparent packaging according to claim 6, wherein the proportion of polyester II in the outer layer (B') is 20 to 70% by weight.

11. The transparent packaging according to claim 1, wherein the outer layer (B') has been produced from three physically miscible polyesters I, II and III.

12. The transparent packaging according to claim 11, wherein the polyester III comprises the following dicarboxylates and alkylenes, based in each case on the total quantity of dicarboxylate and, respectively, total quantity of alkylene:
80 to 98 mol % of terephthalate,
2 to 20 mol % of isophthalate,
wherein the mol % data of the dicarboxylic acids mentioned always give a total of 100%, and
more than 50 mol % of ethylene units.

13. The transparent packaging according to claim 11, wherein the proportion of polyester III in the outer layer (B') is 3 to 15% by weight.

14. Process for the production of transparent packaging for vacuum forming according to claim 1 comprising
producing the lower film (A) by extruding or coextruding, biaxially stretching the lower film (A) in a longitudinal direction at a temperature between 70° and 100° C. via rolls heated to 60 to 110° C. with a longitudinal stretching ratio 2.0:1 to 4.0:1 and in a transverse direction at a temperature between 70° and 120° C., with the film temperature ranging from 60 to 110° C., a transverse stretching ratio of 2.2:1 to 3.8:1, and heat-setting for 5 to 25 s at 175° to 220° C.;
coextruding the melts corresponding to the individual layers B'B", and optionally B"', of the upper film (B) through a flat-film die, solidifying the melts by taking-off the resultant film on one or more rolls, and subsequently biaxially stretching and heat-setting the film.

15. A vacuum-formed pack comprising the transparent packaging according to claim 1.

16. The vacuum-formed pack according to claim 15, wherein said pack is a meat, fish, poultry or ready-to-eat product pack.

17. The vacuum-formed pack according to claim 15, wherein the ready-to-eat product tray is a sandwich, burger or wrap pack.

* * * * *